(12) United States Patent
Bowman et al.

(10) Patent No.: US 7,264,419 B2
(45) Date of Patent: Sep. 4, 2007

(54) SYSTEM AND METHOD FOR REMEDIATING CONTAMINATED SOIL AND GROUNDWATER IN SITU

(75) Inventors: Reid H. Bowman, Ojai, CA (US); Tom Lahey, Laguna Niguel, CA (US); Peter Herlihy, Hamilton, OH (US)

(73) Assignee: Applied Process Technology, Inc., Pleasant Hill, CA (US)

( * ) Notice: Subject to any disclaimer, the term of this patent is extended or adjusted under 35 U.S.C. 154(b) by 0 days.

(21) Appl. No.: 10/805,176

(22) Filed: Mar. 19, 2004

(65) Prior Publication Data

US 2005/0067356 A1   Mar. 31, 2005

Related U.S. Application Data

(60) Provisional application No. 60/456,085, filed on Mar. 19, 2003.

(51) Int. Cl.
*B09C 1/08* (2006.01)
(52) U.S. Cl. .................. 405/128.75; 210/747
(58) Field of Classification Search .......... 405/128.75, 405/128.5; 210/747
See application file for complete search history.

(56) References Cited

U.S. PATENT DOCUMENTS

| | | | | |
|---|---|---|---|---|
| 3,846,290 | A | * | 11/1974 | Raymond .................. 210/610 |
| 4,423,780 | A | | 1/1984 | Vigneri et al. |
| 4,456,069 | A | | 6/1984 | Vigneri |
| 5,286,141 | A | | 2/1994 | Vigneri |
| 5,362,400 | A | | 11/1994 | Martinell |
| 5,449,249 | A | * | 9/1995 | Husten ................ 405/128.15 |
| 5,520,483 | A | | 5/1996 | Vigneri |
| 5,525,008 | A | * | 6/1996 | Wilson .................... 405/128.5 |
| 5,567,444 | A | | 10/1996 | Hei et al. |
| 5,741,427 | A | | 4/1998 | Watts et al. |
| 5,803,664 | A | * | 9/1998 | Kawabata et al. ....... 405/128.5 |
| 6,197,206 | B1 | | 3/2001 | Wasinger |
| 6,312,605 | B1 | | 11/2001 | Kerfoot |
| 6,319,328 | B1 | | 11/2001 | Greenberg et al. |
| 6,352,387 | B1 | * | 3/2002 | Briggs et al. .......... 405/128.25 |
| 6,391,184 | B1 | | 5/2002 | Orolin et al. |
| 6,457,905 | B1 | | 10/2002 | Nickell |
| 2002/0002983 | A1 | | 1/2002 | Greenberg et al. |
| 2003/0029792 | A1 | | 2/2003 | Kerfoot |
| 2006/0186060 | A1 | | 8/2006 | Kerfoot |

OTHER PUBLICATIONS

Niven, Robert K. et al., "In Situ Multiphase Fluidization ("upflow washing") for the remediation of hydrocarbon contaminated sands", Can. Geotech. J. 35: 938-960, 1998.

* cited by examiner

*Primary Examiner*—John Kreck
(74) *Attorney, Agent, or Firm*—Benesch, Friedlander, Coplan & Aronoff LLP (57) ABSTRACT

A system and method for the in-situ removal or remediation of contaminants in a soil formation containing a subsurface groundwater aquifer, the method comprising the steps of: injecting a first oxidant into the aquifer at an injection point to create a volume of influence of the first oxidant in the aquifer thereby treating the contaminants contained within the volume of influence; and injecting a compressed gas into the aquifer to increase the size of the volume of influence of the first oxidant. The injection of the compressed gas into the aquifer can also force the groundwater in the aquifer away from the injection point into a surrounding area to transport the first oxidant into the surrounding area thereby extracting contaminants from soil adjacent to the surrounding area.

25 Claims, 7 Drawing Sheets

SYSTEM AND METHOD FOR REMEDIATING CONTAMINATED SOIL AND GROUNDWATER IN SITU

CROSS-REFERENCE TO RELATED APPLICATIONS

This application claims the benefit of priority of U.S. Provisional Application No. 60/456,085, filed on Mar. 19, 2003, the disclosure of which is herein incorporated by reference in its entirety.

BACKGROUND

Groundwater, a valuable and limited natural resource, can become contaminated by volatile organic compounds (VOC) and semi volatile organic compounds (SVOC) by: (i) leaking underground storage tanks and associated piping (e.g., gasoline stations); (ii) leaking/ruptured pipelines; (iii) chemical spills along roadways, at chemical plants, or manufacturing operations; and (iv) leaching of chemicals disposed of in landfills.

Chemicals spilled as described above, if not immediately cleaned up, can be absorbed into the soil, subsequently transported (depending on the solubility of the contaminant) via rainwater to underground aquifers. Once in the aquifer, the contaminants spread and are carried down gradient. This spreading and movement of the contaminants is known as a "plume". Drinking water wells, buildings, wetlands, etc. which are down gradient of the spill site can be negatively impacted by the contaminant plume, posing health risks to wildlife and to humans.

The treatment of contaminated soils and groundwater has gained increased attention over the past few years because of uncontrolled hazardous waste disposal sites. It is well documented that the most common means of site remediation has been excavation and landfill disposal. While these procedures remove contaminants, they are extremely costly and in some cases difficult if not impossible to perform.

More recently, research has focused on the conversion of contaminants contained in soil and groundwater based on the development of on-site and in situ treatment technologies. One such treatment has been the incineration of contaminated soils. The disadvantage of this system is in the possible formation of harmful by products including polychlorinated dibenzo-p-dioxins (PCDD) and polychlorinated dibenzofurans (PCDF).

In situ biological soil treatment and groundwater treatment is another such system that has been reviewed in recent years. So-called bioremediation systems, however, have limited utility for treating waste components that are biorefractory or toxic to microorganisms.

Such bioremediation systems were the first to investigate the practical and efficient injection of hydrogen peroxide into groundwater and/or soils. These investigations revealed that the overriding issue affecting the use of hydrogen peroxide in situ was the instability of the hydrogen peroxide downgradient from the injection point. The presence of minerals and enzymes such as catalase and peroxidase in the subsurface catalyzed the disproportionation of hydrogen peroxide near the injection point, with rapid evolution and loss of molecular oxygen, leading to the investigation of stabilizers as well as biological nutrients.

During the early biological studies from the 1980's, some investigators recognized the potential for competing reactions, such as the direct oxidation of the substrate by hydrogen peroxide. Certain researchers also hypothesized that an unwanted in situ Fenton's-like reaction under native conditions in the soil was reducing yields of oxygen through the production of hydroxyl radicals, a powerful oxidizing species. Such a mechanism of contaminant reduction was not unexpected, since Fenton's-type systems have been used in ex situ systems to treat soil and groundwater contamination.

Other investigators concomitantly extended the use of Fenton's-type systems to the remediation of in situ soil systems. These studies attempted to correlate variable parameters such as hydrogen peroxide, iron, phosphate, pH, and temperature with the efficiency of remediation.

As with bioremediation systems, in situ Fenton's systems were often limited by instability of the hydrogen peroxide in situ and by the lack of spatial and temporal control in the formation of the oxidizing agent (i.e. hydroxyl radical) from the hydrogen peroxide. In particular, aggressive/violent reactions often occurred at or near the point where the source of the oxidizing agent (the hydrogen peroxide) and the catalyst were injected. As a consequence, a significant amount of reagents including the source of the oxidizing agent (hydrogen peroxide) was wasted because activity was confined to a very limited area around the injection point. In addition, these in situ Fenton's systems often required the aggressive adjustment of groundwater pH to acidic conditions, which is not desirable in a minimally invasive treatment system. Finally, such systems also resulted in the mineralization of the subsurface, resulting in impermeable soil and groundwater phases due to the deleterious effects of the reagents on the subsurface soils.

Other researchers have investigated the use of ozone, either alone or in combination with hydrogen peroxide, in ex situ advanced oxidation processes (AOPs) wherein ozone ($O_3$) and hydrogen peroxide ($H_2O_2$) introduced into water react with each other to form the hydroxyl radical ($HO^*$). The hydroxyl radical formation reaction is as follows:

$$H_2O_2 + 2O_3 \rightarrow 2OH^* + 3O_2 \qquad (1)$$

Hydrogen peroxide, ozone, and hydroxyl radical then come into contact with and oxidize contaminants, destroying them. Glaze and Kang, J. Amer. Water Works Assoc., 80, 51 (1988), is hereby incorporated by reference in its entirety, describes an advanced oxidation process wherein ozone ($O_3$) and hydrogen peroxide ($H_2O_2$) are introduced into contaminated water at atmospheric pressure.

Known AOP decontamination systems suffer from a number of disadvantages. A first disadvantage of known AOP decontamination systems is formation of unwanted disinfection byproducts. For example, bromide ions ($Br^-$), naturally present in the water, can undergo a series of reactions to produce bromate ($BrO_3^-$):

$$3Br^- + O_3 \text{(only)} \rightarrow 3BrO^- \qquad (2)$$

$$BrO + (O_3 \text{ or } HO^*) \rightarrow BrO_3^- \qquad (3)$$

Bromate has recently been designated as a suspected carcinogen, and the U.S.E.P.A. has established a maximum level for drinking water of 10 µg/L. It is thus important to prevent or minimize bromate formation during decontamination of potable water.

In reaction (2) above, neither the hydroxyl radical ($HO^*$) nor hydrogen peroxide alone oxidize bromide to form hypobromite ($BrO^-$). Moreover, reaction (3) must compete with the conversion of hypobromite back to bromide that occurs in the presence of hydrogen peroxide:

$$BrO^- + H_2O_2 \rightarrow Br^- \qquad (4)$$

Thus when hydrogen peroxide concentration is greater, reaction (4) is favored and the formation of bromate is discouraged. See U. von Gunten and Y. Oliveras, Envir. Sci. and Tech., 32, 63 (1998); U. von Gunten, Y. Oliveras, Wat. Res., 31, 900 (1997); W. R. Haag, and J. Hoigne, Envir. Sci. and Tech., 17, 261(1983); U. von Gunten, J. Hoigne and A. Bruchet, Water Supply, 13, 45 which are all hereby incorporated by reference in their entireties.

Figure 1:
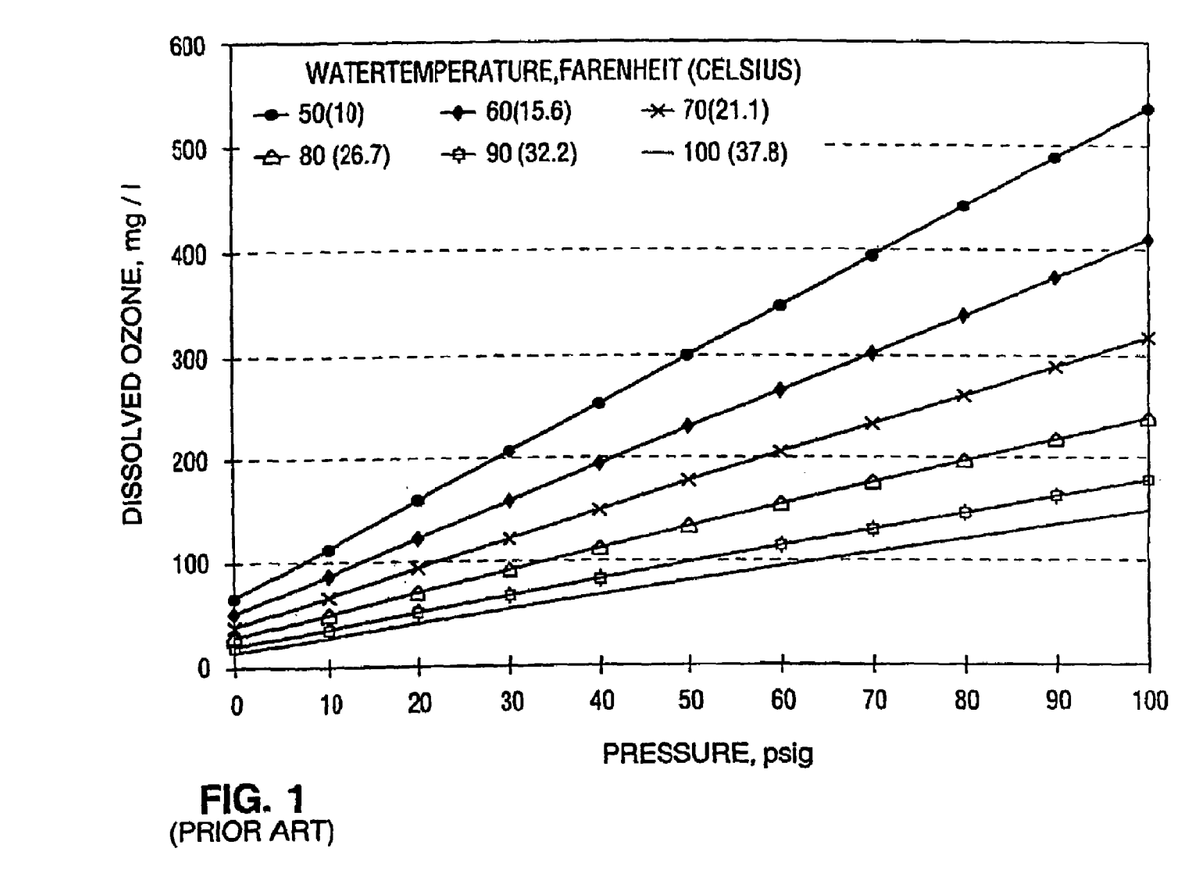
FIG. 1 plots overall pressure versus the concentration of ozone dissolved in water, based upon a 10% (v) concentration of ozone in the gas phase for conventional oxidation decontamination.

A second disadvantage of conventional ozone decontamination systems is the limited solubility of ozone in water at atmospheric pressure. FIG. 1 shows that the solubility of ozone in water increases with higher pressure. However, conventional oxidation decontamination systems introduce ozone at only atmospheric pressure, limiting the amount of ozone that can be dissolved in the water.

Figure 2:
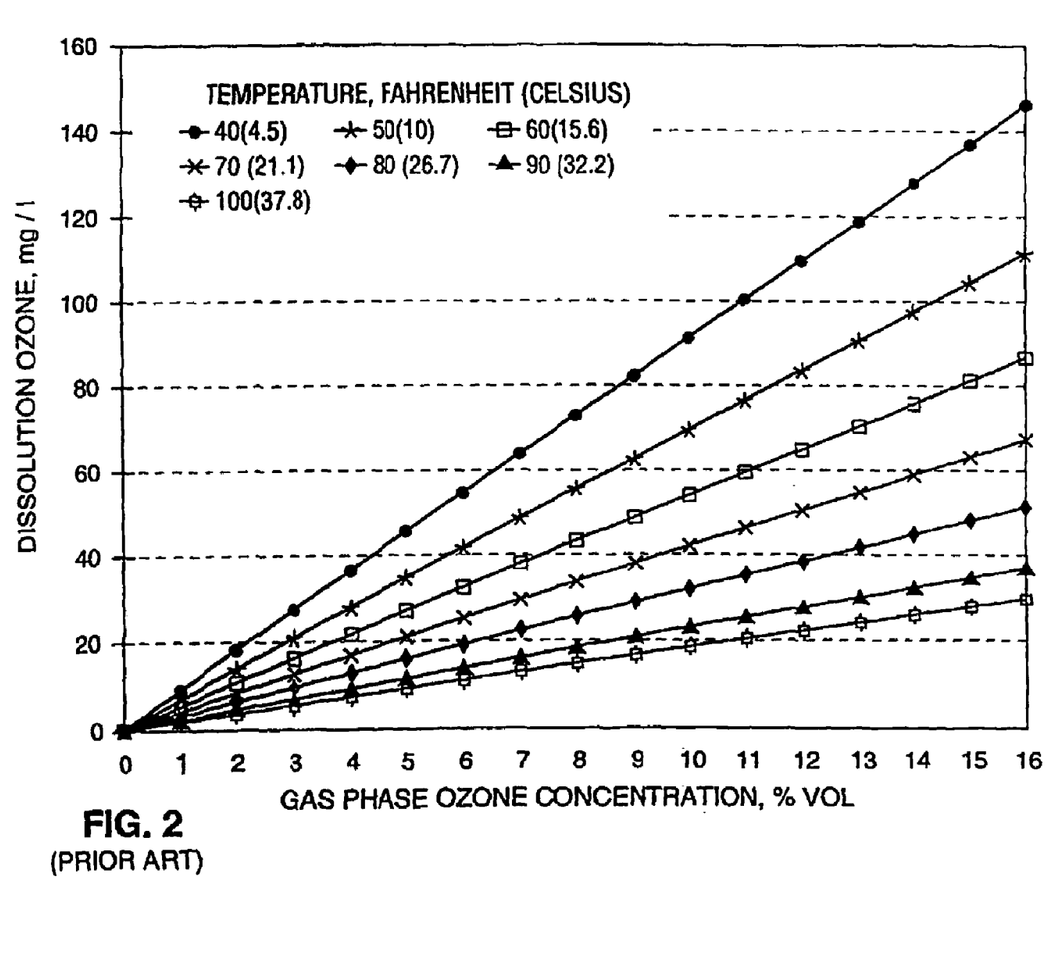
FIG. 2 plots the concentration of ozone in the gas phase versus the resulting concentration of ozone dissolved in water for conventional oxidation decontamination.

A third disadvantage is the limited concentration of ozone normally present in the reactant gas stream that is mixed with the water. FIG. 2 shows that ozone solubility in water increases with increasing ozone in the gas phase. Conventional oxidation systems utilize gas streams containing only about 1-4% ozone by weight in air, effectively limiting the amount of ozone soluble in water.

Finally, these AOP decontamination systems suffer from a similar limitation as all ex situ systems; namely, the necessity to pump contaminants from the in situ media to an external reaction vessel, a requirement which is both expensive and inefficient.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

In the description that follows, like parts/components are indicated throughout the specification and drawings with the same reference numerals, respectively. The figures are not drawn to scale and the proportions of certain parts have been exaggerated for convenience of illustration.

A system and method is provided for the remediation of contaminated soil and groundwater in situ by injecting oxidants and a compressed gas into a region containing contaminated water to oxidize the contaminates present in the contaminated water to thereby decontaminate the region. This remediation system and process can be useful in (i) maximizing destruction of oxidizable contaminants; (ii) minimizing costs associated with the consumption of expensive oxidants; and (iii) controlling quantities of bromate formed as a result of oxidation.

Figure 3:
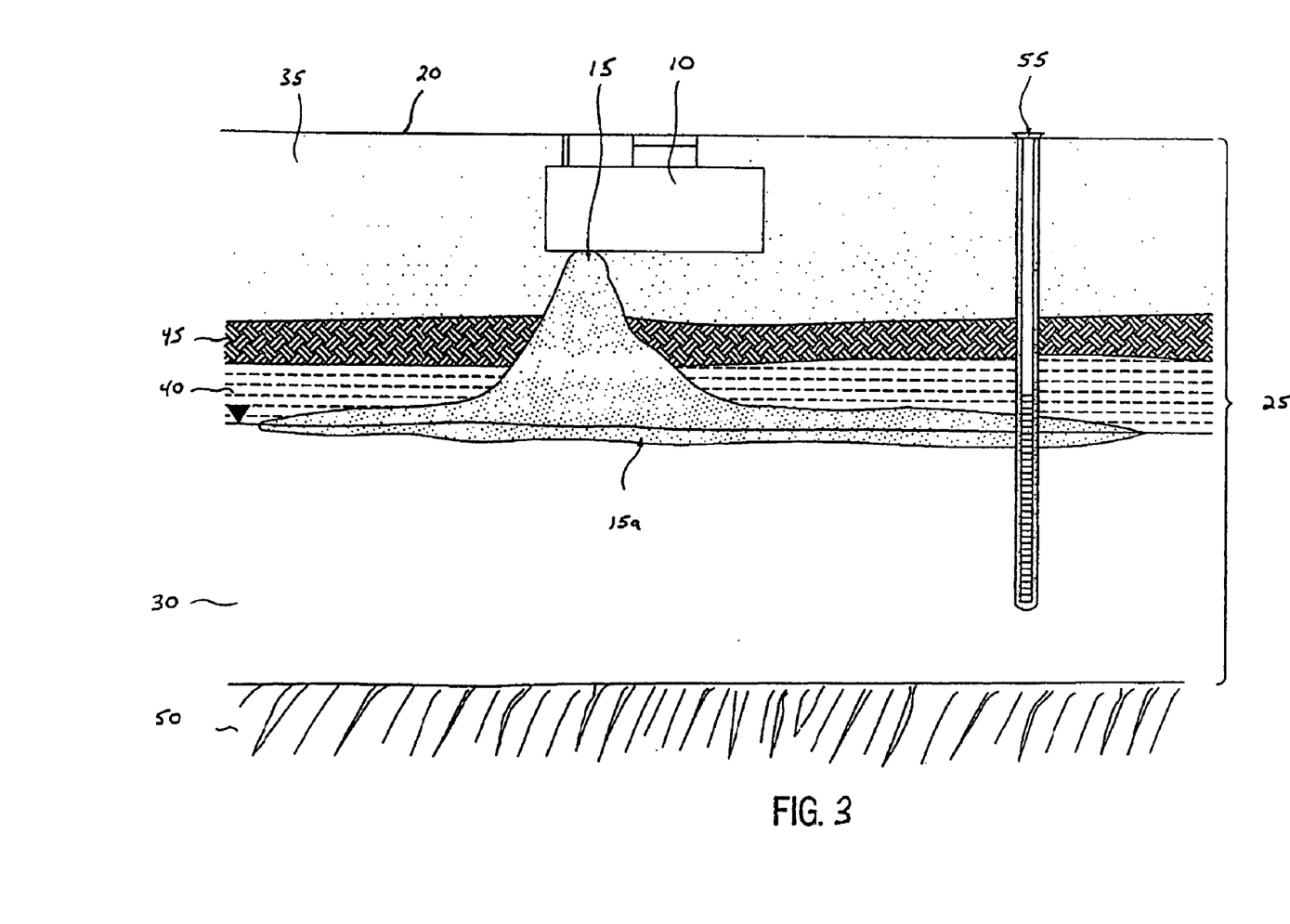
FIG. 3 illustrates a cross-sectional view of a representative remediation site where an underground storage tank (UST) 10 has leaked an organic contaminant into the surrounding soils and groundwater and formed a large contaminant plume.

FIG. 3 is a representative cross-section of a typical remediation site. An underground storage tank (UST) 10 is shown discharging contaminants 15 into the surrounding soils and/or groundwater creating a contaminated region. The discharge can impact three separate areas beneath a ground-level surface 20. The discharge can contaminate soils 25, cause free floating or sinking contaminant on or beneath groundwater 30, and may partially dissolve contaminants into the groundwater 30. As shown in FIG. 3, the soils in which the contaminant comes in contact may be comprised of several different types of soils (e.g., sand 35, silt 40, or clay 45). These different soil structures define the strata of a given region. Frequently, these different types of soils can occur at different depths from the ground-level surface 20. Additionally, representative remediation sites may include one or more underground strata, formed by natural causes, which act as a natural barrier to the unconfined migration of the contaminants 15. While such strata may be impervious to the contaminant 15 migration, if the strata remains intact, fissures or cracks 50 that naturally occur in the strata may provide a conduit through which a contaminated plume 15a may extend. The contaminant plume 15a can include a saturated zone, a smear zone, and an unsaturated zone.

In a typical in situ remediation process, the process can begin with a characterization of the discharged substance(s). Substances which have been discharged to the soil and groundwater can be chemically characterized by a variety of analytical methods, most of which are known in the art. Commonly used analytical methods for chemical characterization of contaminant 15 may include conventional volatile organic analysis (VOA) or BTEX testing, which provides a quantitative determination of benzene, toluene, ethyl benzene, and xylene.

Referring again to FIG. 3, a monitoring well 55 can be bored beneath the ground-level surface 20 for the purpose of extracting a sample of groundwater 30 in an attempt to chemically characterize contaminant 15. Samples of soil 25 and/or groundwater 30 can be taken from a number of locations throughout contaminant plume 15a from which the nature of the discharged substance is determined by an appropriate analytical method. In those instances where the location of the UST 10 acts as the source of the contaminant plume 15a is known beforehand, a contaminant sample may be made directly from the UST 10, if that UST 10 still contains a sufficient volume of the contaminant.

Once the contaminants 15 have been defined, a three-dimensional study can be conducted to determine the volumetric quantities of the impacted area. The shape and size of the contaminant plume 15a can be determined by a number of factors: 1) the size of the UST 10 and the volume of the contaminant that it contained at the time the leak arose; 2) the nature of the contaminant (e.g., heavy, viscous substances such as hydrocarbon based lubricants); and 3) the geological characteristics of the soils and water surrounding the UST 10 (e.g., loose, permeable or tightly-packed soils or fast-moving or stagnant aquifer).

Utilizing the volumetric quantities of the contaminant plume 15a and the composition and concentration(s) of the contaminants, an absolute quantity of contaminant to be treated can be determined. The calculations required for this step are generally known by those skilled in the art. A quantity of hydrogen peroxide and ozone can be empirically determined for effective oxidative treatment of the contaminant mass (oxidant mass/contaminant mass is the oxidant ratio). Factors impacting the oxidant ratio include groundwater characteristics (i.e pH, alkalinity, COD, radical scavengers, metals, etc.). The control of bromate formation can be determined by the mole ratio of hydrogen peroxide to ozone. The mole ratio can range from between about 0.5 to about 20. Factors impacting the mole ratio include groundwater characteristics (i.e. bromide concentration, pH, alkalinity, dissolved organic carbon (DOC), metals, etc.).

In one embodiment, the contaminant plume 15a can be delineated by boring a number of sentinel wells 60 in an area just outside the contaminant plume 15a and then subsequently performing an analytical characterization of samples taken from these wells. By inspection of FIG. 4, it can be seen that the sentinel wells 60 lie outside of the contaminant plume 15a while the monitoring wells 55 lie within the containment plume 15a. Samples taken from the monitoring wells 55 and the sentinel wells 60 will therefore differ in composition and/or concentration as determined through subsequent analytical testing. After boring a number of the monitoring wells 55 and the sentinel wells 60 and performing an analytical characterization of samples taken from these wells, a delineation of contaminant plume 15a can be determined.

Figure 4:
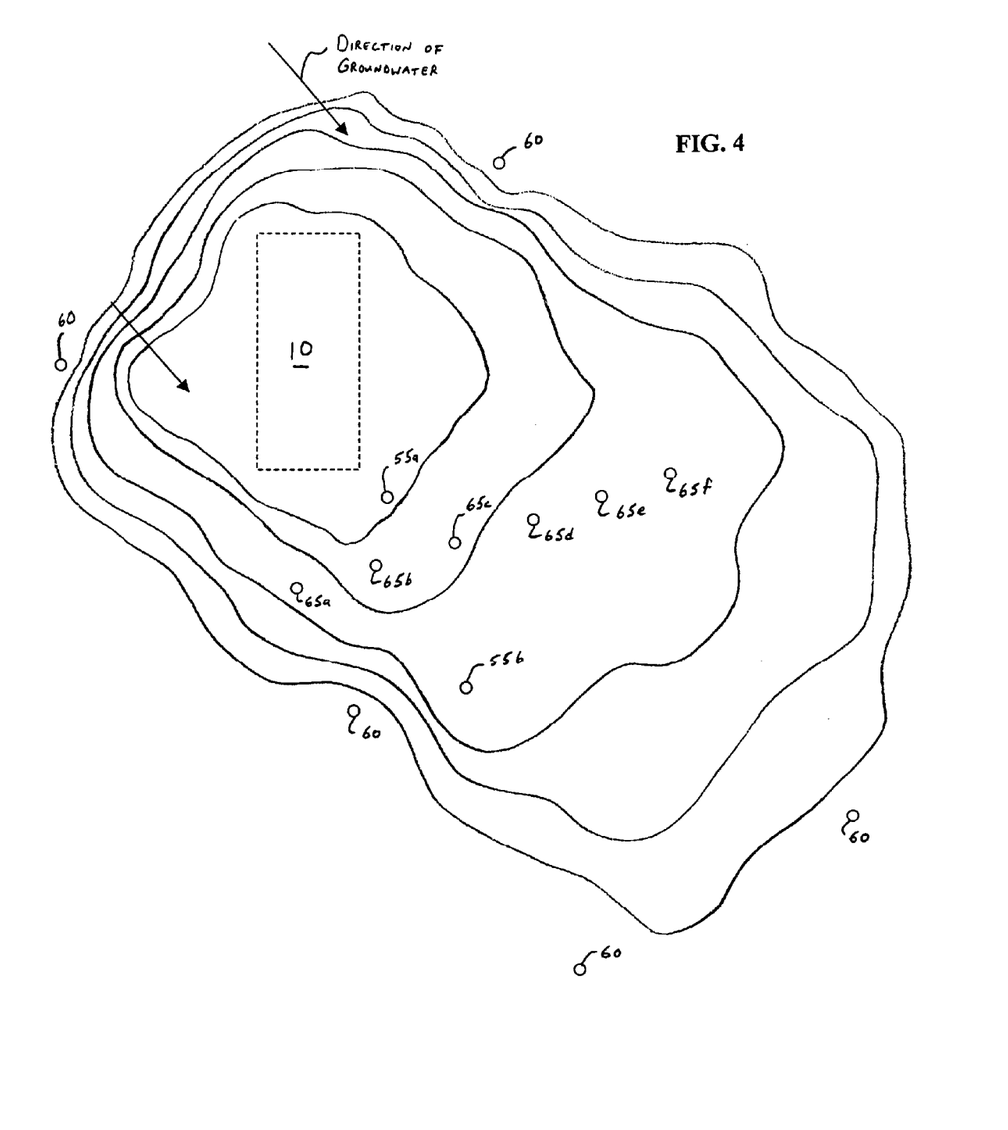
FIG. 4 illustrates a simplified, overhead plan view of the remediation site shown in FIG. 3, where a UST has leaked an organic contaminant into the surrounding soils and the extent of the resulting contaminant plume migration is shown relative to the depth from the surface.

The delineation of the contaminant plume 15a is not limited to just two dimensions as one may perceive from a casual inspection of FIG. 4. For example, a determination of the volume of the contaminant plume 15a is made by analyzing samples from the monitoring wells 55 and the sentinel wells 60 where the samples can be analytically characterized according to the sample depth in the particular well. The data produced from this analysis may not only characterize the distance that the contaminant plume 15a has migrated, but also can characterize at what depth from the ground-level surface 20 that migration has taken place. Such a characterization is well known in the art as vertical delineation.

Next, the hydrological and geological attributes of the contaminated region can be characterized to assist in the determination of the number and position of the injection wells 65 that are required for installation within the contaminated region. These attributes can include: groundwater flow direction and gradient, groundwater characteristics (e.g., mineral content, alkalinity, pH, hardness, and salinity), soil characteristics (e.g., composition of the soil, mineral content, alkalinity, pH, and salinity), soil transmissivity (e.g., soil porosity and soil permeability), and the profile of the geological strata in the contaminated region.

Once the hydrological and geological attributes of the contaminated region are characterized, trials can be conducted to determine the radius of influence (ROI) of a compressed gas continuously sparged into the contaminant plume 15a using standard equipment known in the art. Understanding the ROI provides information useful in determining the placement of multiple injection wells in order to effectively treat the contaminated region. Additionally, trials can be conducted to measure the movement of groundwater in response to pulses of compressed gas in the contaminated plume 15a ("dynamic response") using standard equipment known in the art. Understanding the dynamic response (DR) permits the present remediation system and made to be optimized for pulse duration and frequency.

Based on the hydrological and geological attributes of the contaminated region and once the ROI and DR have been determined, a matrix of injection wells 65 can be mapped out in the contaminant plume 15a such that there is overlap of the ROI appropriate for the contaminant plume 15a and soil conditions. The injection wells 65 may be arranged in a matrix following any arrangement or pattern depending on the shape of the contaminant plume 15a. Depending on the size and characteristics of the contaminant plume 15a, as little as one injection well may be used while as many as 100 or more injection wells may be used for larger contaminant plumes.

One non-limiting example of a matrix of injection wells mapped out in contaminant plume 15a is illustrated in FIG. 4. In this example, the injection wells 65a-f are spaced about 20 feet apart from each other in a substantially linear pattern within the contaminant plume 15a. The monitoring well 55a is provided within the contaminant plume 15a about 15 feet up gradient from the substantially linear pattern of the injection wells 65a-f, while the monitoring well 55b is provided within the contaminant plume 15a about 35 feet down gradient from the substantially linear pattern of the injection wells 65a-f. The monitoring wells 55a-b are capable of measuring groundwater characteristics (e.g., pH, dissolved oxygen, dissolved $CO_2$, oxidative/reductive potential (ORP), and temperature) and contaminant levels.

Figure 5:
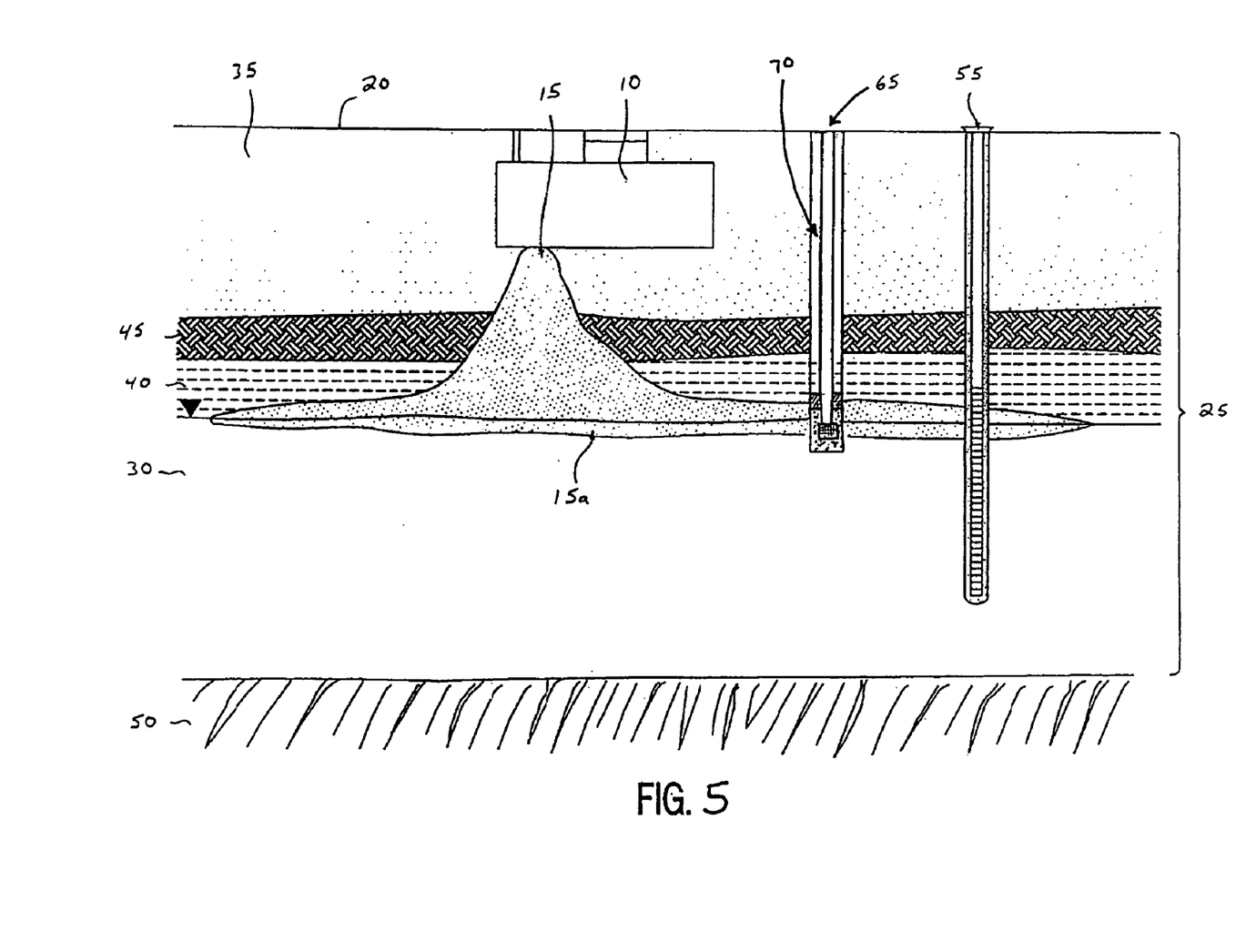
FIG. 5 is a cross sectional view of a typical remediation site showing a leaking UST, the resultant contaminant plume, an injector assembly, and the general characteristics of the soils at such a site.
Figure 6:
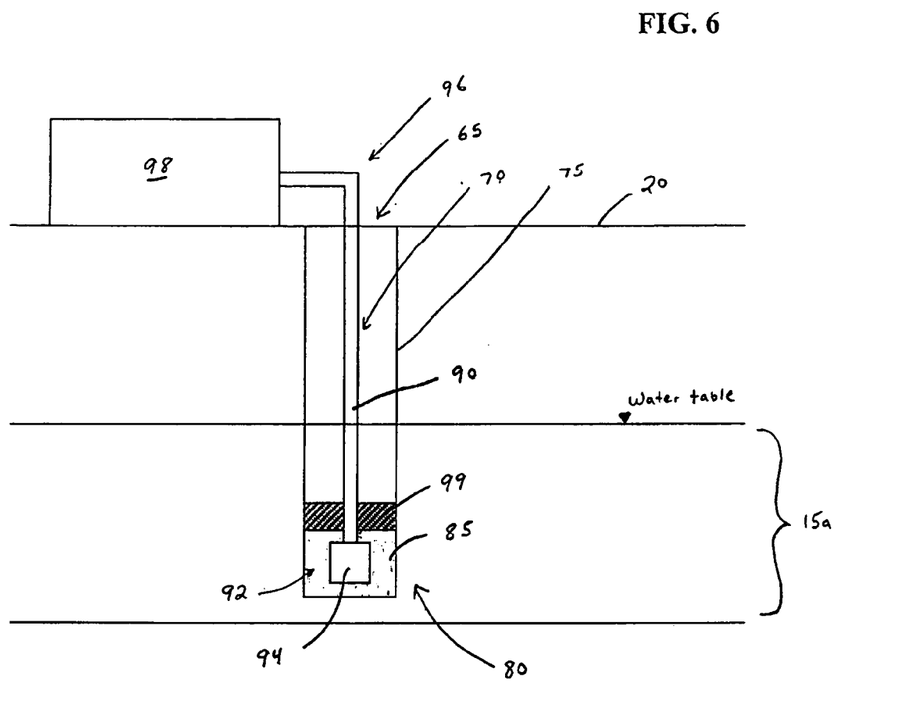
FIG. 6 is a detailed, cross-sectional view of one embodiment of an injection well 65 for treating a remediation site.

FIG. 5 is a cross sectional view of a typical remediation site showing a leaking UST, the resultant contaminant plume, an injector assembly, and the general characteristics of the soils at such a site; FIG. 6 is a detailed, cross-sectional view of one embodiment of an injection well 65 for treating a remediation site. As shown in FIG. 5, each injection well 65 can include at least one injector 70 to inject oxidants and a compressed gas at an injection point into the contaminant plume 15a to oxidize and treat the contaminants. As shown in FIG. 6, the injection well 65 can be a bore hole 75 that extends downwardly from the ground-level surface 20 of the surrounding earth and includes a bottom portion 80 that extends into or below the contaminant plume 15a. The bottom portion 80 of the bore hole 75 can include a highly porous media layer 85 disposed therein to permit the oxidants and/or compressed gas exiting the injector 70 to permeate into the contaminated plume 15a. For example, the highly porous media layer 85 may include sand, gravel, or crushed glass. Alternatively, the injection well 65 may be a screened well casing that extends into or below the contaminant plume 15a. Like the bore hole 75, the screened well casing can include a bottom portion containing a highly porous media layer such as sand, gravel, or crushed glass.

In one embodiment, the injector 70 can include an elongated tube 90 that is placed within and can extend downwardly within the borehole 75. The tube 90 can include a bottom portion 92 that can be connected to an injection diffuser 94 and a top portion 96 that can be connected to an oxidant/compressed gas delivery and control system 98. For example, the injection diffuser 94 may include a mesh screen, sparging tube, or other diffuser known in the art. As illustrated in FIG. 6, the highly porous media layer 85 can surround the injection diffuser 94 and fill a resulting void between the injection diffuser 94 the and bottom portion 80 of the bore hole 75. The injection diffuser 94 can also prevent the highly porous media layer 85 from occluding the tube 90 at the bottom portion 80 of the bore hole 75 thereby permitting dispersion of the oxidants and/or compressed gas throughout the contaminated plume 15a.

To establish a liquid-tight seal around the exterior surface of tube the 90 within the bore hole 75 in order to prevent fluids from flowing in and filling the bore hole 75 around the tube 90, a sealing layer 99 can be provided above the layer of the highly porous media layer 85. In one embodiment, the Sealing layer 99 can be formed of water-swellable bentonite material positioned within the bore hole 75 such that the bentonite material contacts the walls of the bore hole 75 and surrounds the tube 90. The bentonite material completely fills the void between the tube 90 and the bore hole 75 when the bentonite material contacts water thereby forming a seal. In this manner, the portion of the injector 70 located below the sealing layer 99 is completely and effectively sealed from the upper portion of the bore hole 75.

Figure 7:
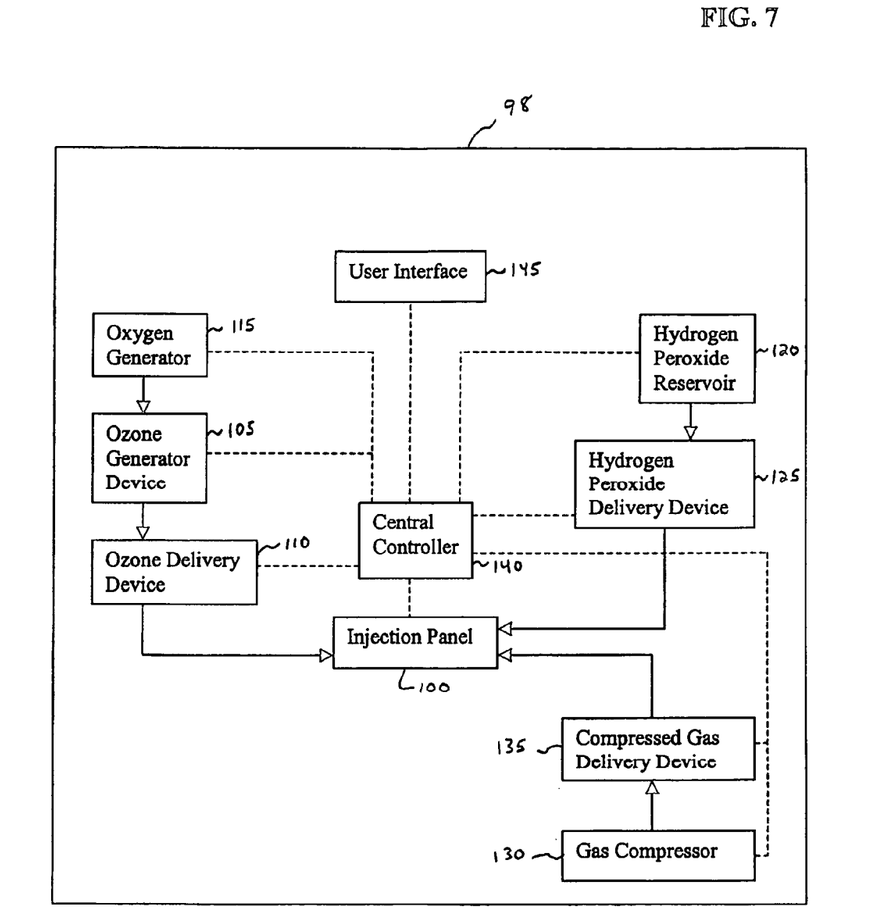
FIG. 7 illustrates one embodiment of a component diagram of oxidant/compressed gas delivery and control system 98.

As shown, FIG. 7 illustrates one embodiment of a component diagram of oxidant/compressed gas delivery and control system 98. As shown in FIG. 7, oxidant/compressed gas delivery and control system 98 is illustrated in a component diagram where the solid lines indicate a hard connection via conduit, tubing, or the like and the dashed lines indicate that the components are in signal communication with each other. In one embodiment, the system 98 can include an injection panel 100 that includes compressed gas and oxidant manifolds and injection valves, flow meters, and pressure gages. The system 98 can further include an ozone generator device 105 configured to generate ozone from oxygen and an ozone delivery device 110 configured to deliver ozone to the injector 70 via the injection panel 100.

In one embodiment, the oxygen may be supplied to the ozone generator device 105 via an oxygen generator device 115 or a supply of oxygen tanks. Although it is preferable to utilize ozone generated from oxygen because generation of ozone in this manner results in a supply of gas containing substantial concentrations of ozone, it is possible to use ozone generated from air yielding lower concentrations of ozone. Thus, the term "ozone" as used herein can refer to an ozone/oxygen mixture and an ozone/air mixture. As shown in FIG. 2, these elevated gas phase ozone concentrations lead to larger quantities of ozone being dissolved in the contaminated water flow. An additional benefit of utilizing ozone generated from oxygen is that oxygen is itself an oxidant. Because contaminated groundwater is typically devoid of oxygen, the introduction of oxygen along with ozone can replenish the oxygen content of the groundwater and may oxidize contaminants, as well as promote biological elements that may further reduce contaminant levels.

In one embodiment, the ozone generator device 105 can be an ASTeX Model 8403 modified to maintain a pressure in the generator higher than that of the contaminated water flow. Generation of ozone from oxygen in this manner can produce an ozone/oxygen mixture stream having ozone concentrations between about 1 and about 14% by weight in oxygen, with most typical ozone concentrations between about 5% and about 10% by weight in oxygen.

With continued reference to FIG. 7, the system 98 can further include a hydrogen peroxide reservoir 120 and a hydrogen peroxide delivery device 125 configured to deliver a hydrogen peroxide solution to the injector 70 via the injection panel 100. In general, the hydrogen peroxide reservoir 120 can be commercially supplied. In one embodiment, the hydrogen peroxide solution can include hydrogen peroxide in concentrations up to 70% by weight in water. As used herein, the term "hydrogen peroxide" can also refer to a hydrogen peroxide solution. In another embodiment, the hydrogen peroxide solution can include hydrogen peroxide in concentrations up to 35% by weight in water.

Furthermore, the system 98 can further include a gas compressor 130 and a gas delivery device 135 configured to deliver a compressed gas to the injector 70 via the injection panel 100. In one embodiment, the compressed gas can be air. Alternatively, the compressed gas may be nitrogen, oxygen, or carbon dioxide. If the compressed gas is not air, then the system 98 may further include a gas source (e.g., nitrogen, oxygen, or carbon-dioxide) to supply the gas to gas compressor 130.

Optionally, the system 98 may further include acid and biological nutrient reservoirs (not shown) and respective delivery devices (not shown) to deliver acids such as acetic acid, phosphoric, or sulfuric acid in conjunction with hydrogen peroxide to enhance a Fenton's type reaction and to deliver biological nutrients to enhance biological degradation of the organic contaminates.

To control the timing (duration and frequency) and order of delivery of the oxidants/compressed gas to each injector 70, a central controller 140 can be provided in signal communication with the injection panel 100. In one embodiment, the central controller 140 can include a microprocessor, a programmable logic controller (PLC), analog and digital interface modules, and customized software. The central controller 140 may further include a user interface 145 for operator control and may optionally include a modem or other device to transmit and receive data from a remote location.

In one embodiment, the system 98 can be configured to deliver ozone, hydrogen peroxide, and compressed gas alone or in any combination to the contaminant plume 15a via the injector 70. In other words, ozone may be delivered to the contaminant plume 15a via the injector 70 alone or in combination with compressed air and hydrogen peroxide. Likewise, compressed gas may be delivered to the contaminant plume 15a via the injector 70 alone in combination with ozone and hydrogen peroxide. Similarly, hydrogen peroxide can be delivered to the contaminant plume 15a via the injector 70 alone or in combination with ozone and compressed gas. Although a single injection point may be used, it will be appreciated that more than one injection point can be used to deliver the oxidants and compressed gas. For example, multiple injectors can be used to separately deliver the ozone, hydrogen peroxide, and compressed gas to the contaminant plume 15a.

Examples of possible injection combinations of ozone, hydrogen peroxide, compressed gas, and a combination of ozone/compressed gas that can be delivered to the contaminant plume 15a via the injector 70 (hereinafter referred to as "injection sequences") are illustrated in Table I. For example, as shown in injection sequence number 1, hydrogen peroxide (at a particular concentration, pressure, and flow rate) can be first injected into the contaminant plume 15a for 10 minutes, creating a sphere of influence of the hydrogen peroxide followed by an injection of compressed gas (at a particular concentration, pressure, and flow rate) for 10 minutes to increase the size of the sphere of influence of the hydrogen peroxide, followed by a status quo period (indicated as nothing in Table I) for 10 minutes, and followed by an injection of ozone and compressed air combined (at a particular concentration, pressure, and flow rate) for five minutes. As used herein, although the term "sphere of influence" has meaning to one skilled in the art, the term "volume of influence" can also be used to represent the fact that the injected hydrogen peroxide or any other oxidant does not create a perfect sphere shape. Although only four injection sequences are illustrated in Table I, it is understood that there are numerous possible injection combinations that may be employed.

TABLE I

| Sequence No. | Injection 1 | Injection 2 | Injection 3 | Injection 4 |
|---|---|---|---|---|
| 1 | hydrogen peroxide (10 minutes) | compressed gas (10 minutes) | nothing (10 minutes) | ozone/compressed gas combined (5 minutes) |
| 2 | hydrogen peroxide (10 minutes) | compressed gas (10 minutes) | ozone (5 minutes) | nothing (10 minutes) |
| 3 | hydrogen peroxide (10 minutes) | ozone/compressed gas combined (5 minutes) | nothing (10 minutes) | compressed gas (5 minutes) |
| 4 | hydrogen peroxide (5 minutes) | nothing (10 minutes) | ozone/compressed gas combined (5 minutes) | compressed gas minutes) |

Furthermore, the system 98 can be configured to deliver the same or different injection sequences at different injection wells 65 situated in the contaminant plume 15a. For example, while the injector in injector well 65a is performing injection sequence 1 illustrated above, the injector in injector well 2 can be performing the same injection sequence 1 or can be performing other injector sequences (e.g., injection sequence 2-4 or other sequences).

As stated above, the central controller 140 can be configured to control the amount, pressure, and concentration (in the case of ozone) of the oxidants and compressed gas delivered to contaminant plume via injector 70. The allocation (or amount) of the oxidants delivered to each injection well 65 can be determined based on the characteristics of the contaminant plume 15a. The allocation of compressed gas to each injection well 65 can be determined based on the oxidant allocation and DR. The time constants for the injection sequences, injection pulsation frequencies, and magnitude (i.e., pressure and/or flow rate) can then be empirically determined and programmed into the user interface 145 of the central controller 140.

Once all of the injection parameters for the oxidants and compressed gas (e.g., timing (i.e., duration and frequency), amount, pressure, flow rate, oxidant ratio, and mole ratio) have been determined and stored into the central controller 140, a user can then program the injection sequences for each injection well 65 as shown above in Table I. At this time, the remediation system can then be operated to inject the oxidants and compressed gas into the contaminant plume 15a according to the programmed injection sequences. The injection sequences include injecting the oxidants and other chemicals into a well or series of wells and forcing the migration of the oxidants into the contaminated area by pulsed injections of compressed gas.

In one embodiment, the injection of compressed gas following the injection of one or more oxidants can increase the sphere or volume of influence of the oxidant(s) in the aquifer. By increasing the sphere of influence of the oxidant(s) in the aquifer, the oxidant(s) can destroy more contaminants present in the groundwater or saturated zone of the contaminant plume 15a.

In another embodiment, the injection of compressed gas can also force the contaminated groundwater away from the injection well or injection point into a surrounding area (e.g., the saturated, smear, or unsaturated zones of the contaminate plume 15a) and transport the oxidants and other chemicals into the area surrounding the injection well(s). When the groundwater is forced into the surrounding area, the groundwater can extract or desorb contaminants from soil adjacent to the surrounding area. When the injection of the compressed gas is discontinued, the groundwater can return to an over adjacent to the well(s) thereby returning the contaminants extracted from the soil to the area adjacent to the injection well(s).

In one embodiment, the flow and pressure of compressed gas and the periodic cycling of injections can be regulated to optimize the transport of the oxidants into the contaminated area surrounding the injection well(s). The pulsed injection of compressed gas can act to agitate the soil/groundwater matrix and desorb organic contaminants from the soil thereby bringing them into solution by forced turbulence in the contaminant plume 15a. The movement of water or the displacement of water can help to mix the oxidants to produce more hydroxyl radicals.

Because the remediation system described herein can inject a gas (i.e., ozone, compressed air, or combination of both) and a liquid (i.e., hydrogen peroxide) through the same injector, the gas and liquid can readily and intimately mix in the soil in the correct proportions, facilitating the desirable hydroxyl radical reaction. Of course, many other combinations of liquids including a variety of dissolved gases, chemicals such as acids, and/or biological agents such as biological nutrients can also be employed. Examples of acids that could be injected include acetic acid, phosphoric, or sulfuric acid. The injection of an acid in conjunction with hydrogen peroxide can enhance a Fenton's reaction. Examples of biological nutrients that can be utilized include ammonium phosphate or propane. The injection of a biological nutrient can also enhance the biological degradation of the organic contaminates. If air or another gas is also injected into the soil, it can help to cause microfractures, facilitating dispersion of the liquids and, if air or other oxygen-containing gas is used, can also supply oxygen for biological agents.

During operation of the remediation system described herein, real-time measurements of dissolved oxygen (DO), oxidation/reduction potential (ORP), and temperature at monitoring wells 55a, 55b may be taken to re-allocate the injection of hydrogen peroxide and ozone-containing gas in each of injection wells 65a-65f so as to maintain constant, optimum levels of DO, ORP, and temperature. Furthermore, real-time measurements of dissolved $CO_2$ at monitoring wells 55a, 55b may be taken to re-allocate the injection of hydrogen peroxide and ozone-containing gas in the event that $CO_2$ declines significantly, indicating a reduction in contaminants. Optionally, the re-allocation of ozone-containing gas may be accomplished by the reduction of the ozone concentration in the ozone containing gas.

The invention can be illustrated further by the following examples, which are not to be construed as limiting its scope.

EXAMPLE 1

Utilizing a single injection well to deliver oxidants and compressed air to a contaminated region containing contaminated groundwater, the following injection sequence is used.

| Step | Duration | $H_2O_2$ | Ozone | Air |
|------|----------|----------|-------|-----|
| 1 | 10 min | yes | no | no |
| 2 | 10 min | no | no | yes |
| 3 | 20 min | no | no | no |
| 4 | 10 min | no | yes | yes |
| 5 | 10 min | no | no | no |

As shown above, $H_2O_2$ can be first injected into the contaminated region for 10 minutes to form a pool of $H_2O_2$ into the immediate area of the injection point (i.e., sphere of influence). Compressed air can then be injected into the contaminated region for 10 minutes to mix the $H_2O_2$ with the groundwater and agitate the contaminants to bring them into solution. The addition of the compressed air can also serve to de-water the area around the injection point. Following the injection of the compressed air for 10 minutes, no action is taken for 20 minutes to allow the de-watered area to collapse such that the $H_2O_2$ and groundwater that were driven out of the area around the injection point will return to the area thereby further mixing and agitating the area. Diluted ozone can then be injected into the $H_2O_2$ and groundwater solution for 10 minutes thereby creating OH* radicals, which will oxidize the aqueous contaminants and will also further agitate the soil and groundwater. Following the injection of ozone for 10 minutes, no action can be taken for 10 minutes to allow the groundwater to collapse again. This five step injection sequence may repeated until the contaminated region is remediated.

EXAMPLE 2

Utilizing multiple injection wells to deliver oxidants and compressed air to a contaminated region containing contaminated groundwater where the injection wells were positioned as shown in FIG. 4 so that the ROI overlap and where a highly contaminated region existed between injection wells 65b and 65c, the following injection sequence was used.

| Step | Duration | $H_2O_2$ | Ozone | Air |
|------|----------|----------|-------|-----|
| 1 | 10 min | yes (well 65b) | no | no |
| 2 | 10 min | no | no | yes (well 65a) |
| 3 | 10 min | no | yes (well 65c) | yes (well 65c) |

As shown above, $H_2O_2$ was first injected into the contaminated region for 10 minutes to form a pool of $H_2O_2$ (i.e., sphere of influence) into the immediate area of the well 65b, which is the center of the three wells (65a-c). Compressed air was then injected into the well 65a for 10 minutes to push the groundwater closer to well 65a, mix the $H_2O_2$ with the groundwater closer to the well 65b, and agitate the contaminants to bring them into solution. Following the injection of compressed air for 10 minutes, diluted ozone and compressed air was then injected into the well 65c for 10 minutes thereby creating OH radicals, which will oxidize the aqueous contaminants closer to the well 65b because of the ROI overlap. This three step injection sequence was repeated until the contaminated region was remediated.

The remediation process described above utilizing the above injection sequence yielded the following results where MTBE represents Methyl tert-Butyl Ether, TBA represents tert-Butyl Alcohol, TAME represents tert-Amyl Methyl Ether, and ND represents non-detectable. The first data point is from monitoring well 55a, which is about 15 feet up gradient of the linear array of injection wells 65a-f.

| | Contaminant Levels (ppb) | | |
|---|---|---|---|
| Time | MTBE | TBA | TAME |
| prior to remediation | 1500 | 790 | 750 |
| 9 wks into remediation | ND (<0.5) | ND (<10) | ND (<0.8) |

The second data point is from monitoring well 55b, which is about 35 feet down gradient of the linear array of injection wells 65a-f.

| | Contaminant Levels (ppb) | | |
|---|---|---|---|
| Time | MTBE | TBA | TAME |
| prior to remediation | 440 | 34 | 3 |
| 9 wks into remediation | ND (<0.5) | ND (<10) | ND (<0.8) |

EXAMPLE 3

A release of unleaded gasoline was identified at a site during regulated underground storage tank (UST) upgrade activities during September 1995. Soil sample analytical results indicated that benzene, toluene, ethylbenzene and xylenes (BTEX) exceeded applicable Pennsylvania Department of Environmental Protection (PADEP) soil quality standards.

Soil borings were completed using direct-push and hollow-stem auger drilling methods during October and November 1995. The findings of these investigations confirmed the presence of benzene and toluene in soil at concentrations exceeding applicable PADEP soil quality standards north and northwest of the dispenser island area and product piping.

In November 1995, three monitoring wells (MW-1, MW-2, and MW-3) were installed. Five additional monitoring wells (MW-4 through MW-8) were installed in 1998. A groundwater pump and treat system began operation in April 1999 and is currently operating. Since groundwater monitoring was initiated onsite in December 1995, dissolved benzene and methyl tert butyl ether (MTBE) have been detected at MW-2, MW-3, and MW-3 in groundwater above applicable PADEP media specific concentrations (MSCs).

Dissolved MTBE has also been detected offsite to the north and northeast of the site above the MSC.

During April, 2003, additional soil quality delineation was completed on the rear portion of the site. The findings confirmed that benzene, toluene, ethylbenzene, MTBE and naphthalene were detected at concentrations above applicable PADEP MSCs in several borings along the north and northeast property boundary.

The available drill logs also indicate that groundwater was encountered at depths ranging from 12 to 15 feet below grade, slightly above the bedrock surface. Static water levels measured at site monitoring wells on Apr. 17, 2003 range from three to nine feet below grade. It appears that the aquifer at the site comprises a shallow water-bearing zone perched above the bedrock surface and a deeper water-bearing zone occurring in fractures and bedding planes of the underlying bedrock.

The two injection wells were constructed using 304 stainless steel riser. Each of the injection wells was constructed by installing two ½-inch diameter stainless steel points (one point for oxygen/ozone and one point for hydrogen peroxide) into a six-inch diameter borehole. Each borehole was advanced to an appropriate depth below the static water table (maximum of 20 feet bgs). Each hydrogen peroxide injection well was completed with a two foot section of stainless steel well screen. Each oxygen/ozone injection well was completed with a ceramic diffuser at the end of the riser. The ozone diffuser was installed at the bottom of the boring. Sandpack was placed surrounding the diffuser and to a depth of two feet above the top of the diffuser. A bentonite seal (minimum of one foot thick) was placed above the sandpack surrounding the ozone diffuser to prevent short-circuiting. Following the installation of both the diffuser and the well screen, each borehole was filled with concrete grout and completed with a protective, locking access vault, which was mounted flush to grade.

Of the two injection points, the first injection point (IP-1) was installed in the existing groundwater interception trench and is intended to address hydrocarbon impact to groundwater above bedrock, observed at approximately 14 feet bgs. The second injection point (IP-2) was installed into the top of the bedrock surface, observed at 14 to 16 feet bgs.

Observation wells were located within 15 feet of the injection points and were constructed with two-inch diameter schedule 40 PVC screen and casing. Clean silica sand filter pack was installed across the screened interval and a bentonite seal was installed above the sand pack to prevent the migration of surface water or groundwater from zones above the screened interval into the well. The remaining annular space above the bentonite seal was filled with grout to surface grade.

Feasibility testing was conducted on Jun. 27, 2003 utilizing AS technology and on Jul. 2, 2003 utilizing the chemical oxidation technology at two locations (IP-1 and IP-2). AS was utilized to estimate the oxygen/ozone radius-of-influence under varying air injection flow rates. Air injection can be effectively used to estimate the expected radius-of-influence during ozone injection since both air and oxygen/ozone will be distributed similarly in the subsurface under varying injection flow rates (typically between 1 and 10 standard cubic feet per minute [scfm]). AS feasibility testing was performed using Data Acquisition and Processing Laboratory (DAPL). which is a self-contained platform that provides computerized on-site real-time data acquisition and processing evaluation.

On Jul. 2, 2003, a one-day oxygen, ozone, air, and hydrogen peroxide injection test was conducted at the site. The oxygen/ozone stream used was a mixture of at least 90% oxygen and a maximum of 10% ozone at a flow rate of up to 0.7 scfm. This flow rate could have been increased up to 20 scfm by adding supplemental atmospheric air pumped into the subsurface via oil-less air compressors. Approximately 110 gallons of hydrogen peroxide were injected into the two injection points during the chemical oxidation event.

The ozone components of the system include an air compressor, pressure swing adsorption unit, and ozone generator. The air compressor and pressure swing adsorption unit are utilized to generate oxygen and are commonly used with oxygen/ozone generators. The air produced by the compressor is directed into a pressure swing adsorption unit which adsorbs the nitrogen naturally present in the air stream, resulting in an oxygen-rich air stream to feed the ozone generator. The nitrogen adsorption unit periodically exhausts small volumes of nitrogen back into the atmosphere. The flow of the oxygen stream is monitored by a flow indicator. The flow is also transmitted to a flow controller which operates a solenoid valve to ensure a constant flow is delivered to the ozone generator.

Testing was conducted in the existing interception trench at injection point IP-1 and in the native soil at injection point IP-2 to obtain the necessary information to determine the feasibility of the technology and to provide the necessary data for the subsequent installation of a remediation system for the site.

Chemical oxidation testing was performed at injection points IP-1 and IP-2 to determine the effectiveness and applicability of the technology to site conditions. Testing was completed at each injection point in several steps ranging from low flow, high ozone concentration to high flow, low ozone concentration. The moderate to high flow steps were achieved by adding compressed air to the oxygen/ozone stream as a carrier gas. Prior to injection of the ozone/oxygen stream, approximately 50 gallons of 18% hydrogen peroxide was injected into each injection well to saturate the subsurface with peroxide. Subsequent injections of the oxygen/ozone stream allows for the production of hydroxyl radicals, which are more powerful oxidizers than ozone or hydrogen peroxide individually, through the reaction of ozone and hydrogen peroxide. Similar to the AS testing, groundwater quality measurements were obtained throughout testing. In addition, headspace readings were collected for LEL, percent oxygen, and ozone.

An evaluation of the groundwater results indicates an overall reduction in the BTEX and MTBE concentrations as summarized in Table 2. The most significant reduction was observed, as expected, at injection well IP-2. The initial BTEX and MTBE concentrations were 293.7 micrograms per liter ($\mu$g/L) and 164 $\mu$g/L, respectively. Following all testing activities, the BTEX and MTBE concentrations were reduced to non-detect (ND) at a reporting limit of 1 $\mu$g/L.

Reductions in dissolved BTEX concentrations at the three newly installed observation wells were 10%, 14%, and 11% for monitoring wells MW-9, MW-10, and MW-11, respectively, between the post AS samples and final samples. Dissolved MTBE concentrations were reduced by 26%, 29%, and 9% at wells MW-9, MW-10, and MW-11, respectively. The overall reductions observed at monitoring well MW-9, comparing pre-testing and final samples were 20% for BTEX and 47% for MTBE. Monitoring wells MW-10 and MW-11 are located immediately downgradient of the two injection points. Monitoring well MW-9 is located immediately upgradient of the two injection points. The results from the other three observation wells (MW-3R, SP-East, and SP-West), located side-gradient to the injection area, did not show decreases in concentrations. All three of the monitoring wells which indicated dissolved BTEX and MTBE concentration decreases (MW-9, MW-10, and MW-11) measured positive pressure influences during chemical oxidation testing at IP-1 and IP-2.

TABLE 2

FEASIBILITY TEST GROUNDWATER ANALYTICAL RESULTS - VOCs

| Well ID | Description | Benzene | Toluene | Ethylbenzene | Xylenes | BTEX | MTBE | BTEX % Difference | MTBE % Difference |
|---|---|---|---|---|---|---|---|---|---|
| IP-1 | Pre-Rem | 212.0 | 19.0 | 140.0 | 329 | 700.0 | 177 | — | — |
|  | Post-Rem | NA | NA | NA | NA | — | NA | — | — |
| IP-2 | Pre-Rem | 26.2 | 15.7 | 55.8 | 196 | 293.7 | 164 | — | — |
|  | Post-Rem | ND (1) | ND (1) | ND (1) | ND (1) | — | ND (1) | 100% | 100% |
| MW-3R | Post-Air | 49.6 | 1.6 | 83.8 | 13.5 | 148.5 | 137 | — | — |
|  | Post-Rem | 55.1 | 1.7 | 114.0 | 19.5 | 190.3 | 120 | −28% | 12% |
| MW-9 | Pre-Rem | 394.0 | 10.4 | 125.0 | 68.6 | 598.0 | 3,210 | — | — |
|  | Post-Air | 354.0 | 9.0 | 105.0 | 65.8 | 533.8 | 2,370 | 11% | 26% |
|  | Post-Rem | 296.0 | 9.5 | 105.0 | 69.9 | 480.4 | 1,690 | 20% | 47% |
| MW-10 | Post-Air | 23.2 | 0.57 | 16.6 | 3.9 | 44.3 | 287 | — | — |
|  | Post-Rem | 23.4 | ND (1) | 9.8 | 4.9 | 38.1 | 240 | 14% | 16% |
| MW-11 | Post-Air | 1,470 | 602 | 988 | 4,570 | 7,630 | 7,940 | — | — |
|  | Post-Rem | 1,360 | 584 | 1,100 | 3,740 | 6,784 | 7,220 | — | — |
| SP-East | Post-Air | 80.7 | 27.7 | 16.1 | 289.0 | 413.5 | 245 | — | — |
|  | Post-Rem | 102.0 | 36.9 | 13.3 | 277.0 | 429.2 | 449 | −4% | −83% |
| SP-West | Post-Air | 57.8 | 6.3 | 16.3 | 94.2 | 174.6 | 168 | — | — |
|  | Post-Rem | 45.6 | 4.5 | 13.2 | 80.3 | 143.6 | 178 | 18% | −6% |

Notes:
VOCs—volatile organic compounds
Pre-Rem = Pre-Remediation
Post-Rem = Post-Remediation
Post-Air = Post-Air Sparge
ND = Not Detected
NA = Not analyzed
MTBE = Methyl tert-butyl ether
BTEX = sum of benzene, toluene, ethylbenzene, and total xylenes
All values are reported in micrograms per liter (µg/L)

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A method for the in-situ removal or remediation of contaminants in a soil formation containing a subsurface groundwater aquifer, the method comprising the steps of:
    injecting a first oxidant into the aquifer at a first injection point to create a first volume of influence in the aquifer;
    injecting a compressed gas into the aquifer at the first injection point to increase the size of the first volume of influence;
    injecting a second oxidant into the aquifer at a second injection point to create a second volume of influence in the aquifer, wherein the first oxidant and the second oxidant are different from each other; and
    injecting a compressed gas into the aquifer at the second injection point to increase the size of the second volume of influence.

2. The method of claim 1, wherein the injection of the compressed gas into the aquifer forces the groundwater in the aquifer away from the first injection point into a surrounding area thereby transporting the first oxidant into the surrounding area.

3. The method of claim 2, wherein the surrounding area includes the saturated zone.

4. The method of claim 3, wherein the injection of the compressed gas into the aquifer forces the groundwater into the saturated zone, thereby extracting contaminants from soil adjacent to the saturated zone.

5. The method of claim 2, wherein the surrounding area includes the smear zone.

6. The method of claim 1, further comprising the step of:
    after injecting a compressed gas into the aquifer at the first injection point, allowing the groundwater to return to the first volume of influence from the surrounding area by discontinuing injection of the compressed gas into the aquifer at the first injection point for a period of time, thereby returning the contaminants extracted from the soil to the first volume of influence.

7. The method of claim 1, wherein the first oxidant is selected from the group consisting of a hydrogen peroxide solution, an ozone/air mixture, an ozone/oxygen mixture, and combinations of an ozone/air mixture and an ozone/oxygen mixture.

8. The method of claim 1, further comprising the step of:
    injecting the second oxidant in combination with compressed gas into the aquifer to treat the contaminants contained within the aquifer.

9. The method of claim 1, wherein the compressed gas is selected from the group consisting of air, nitrogen, oxygen, carbon dioxide, and any combination thereof.

10. The method of claim 1, wherein the first injection point and the second injection point are spaced from each other.

11. The method of claim 1, further comprising the step of:
    after injecting a compressed gas into the aquifer at the second injection point, allowing the groundwater to return to the second volume of influence from the saturated zone by discontinuing injection of the compressed gas into the aquifer at the second injection point for a period of time, thereby returning the contaminants extracted from the soil to the second volume of influence.

12. The method of claim 1, wherein the steps are performed sequentially and in any order.

13. A method for the in-situ removal or remediation of contaminants in a soil formation containing a subsurface groundwater aquifer, wherein the contaminants are spread out by diffusion, movement of the groundwater, and other mechanisms to form a contaminant plume, the method comprising the steps of:

sequentially injecting, in any order, a hydrogen peroxide solution, an ozone/oxygen mixture, and compressed gas into the aquifer, the hydrogen peroxide solution and the ozone/oxygen mixture being injected from first and second injection points, respectively, to treat the contaminants contained within the groundwater, wherein the injection of the compressed gas forces the groundwater away from the first and second injection points into a saturated zone or smear zone of the contaminant plume, thereby transporting the hydrogen peroxide solution and the ozone/oxygen mixture into the saturated zone or smear zone of the contaminant plume.

14. The method of claim 13, wherein the groundwater transported into the saturated zone or smear zone of the contaminant plume desorbs contaminants from soil adjacent to the saturated zone or smear zone of the contaminant plume thereby bringing such contaminants into solution to be subsequently treated.

15. The method of claim 14, further comprising the step of:

after the compressed gas injection step, allowing the groundwater to return to the first injection point from the saturated zone or smear zone of the contaminant plume thereby returning the contaminants desorbed from the soil to an area adjacent to the injection point.

16. The method of claim 15, wherein the injection of the compressed gas is periodically cycled to agitate the contaminants to bring them into solution with the groundwater.

17. The method of claim 14, wherein a third oxidant in combination with the compressed gas can be sequentially injected into the aquifer to treat the contaminants contained within the aquifer.

18. The method of claim 14, further comprising the step of:

sequentially injecting, in any order, one or more oxidants and compressed gas into the aquifer at multiple injection points to optimize the mixing and movement of the oxidants within the contaminant plume.

19. The method of claim 18, wherein the sequential injection of one or more oxidants and compressed gas into the aquifer at multiple injection points increases the desorption and agitation of the contaminants into the groundwater.

20. A method for the in-situ removal or remediation of contaminants in a soil formation containing a subsurface groundwater aquifer, the method comprising the steps of:

intermittently introducing, individually and in any order, a first oxidant, a second oxidant, and compressed gas into the groundwater to treat the contaminants contained within the aquifer, wherein the introduction of each oxidant creates a volume of influence of each oxidant, wherein the introduction of the compressed gas increases the size of each volume of influence of each oxidant, and wherein the first oxidant and the second oxidant are injected at separate injection points, wherein the first oxidant is different from the second oxidant.

21. The method of claim 20, wherein a second oxidant in combination with the compressed gas can be alternately injected into the aquifer to treat the contaminants contained within the aquifer.

22. A method for the in-situ removal or remediation of contaminants in a soil formation containing a subsurface groundwater aquifer, the method comprising the steps of:

injecting a first oxidant into the aquifer at a first injection point to create a first volume of influence in the aquifer;

injecting a compressed gas into the aquifer at the first injection point to increase the size of the first volume of influence;

injecting a second oxidant into the aquifer at a second injection point to create a second volume of influence in the aquifer; and injecting a compressed gas into the aquifer at the second injection point to increase the size of the second volume of influence, wherein the second oxidant is selected from the group consisting of a hydrogen peroxide solution, an ozone/air mixture, an ozone/oxygen mixture, and combinations of an ozone/air mixture and an ozone/oxygen mixture, with the proviso that if the first oxidant is a hydrogen peroxide solution, the second oxidant must be an ozone/air mixture, an ozone/oxygen mixture, or a combination of an ozone/air mixture and an ozone/oxygen mixture; and if the first oxidant is an ozone/air mixture, an ozone/oxygen mixture, or a combination of an ozone/air mixture and an ozone/oxygen mixture, the second oxidant must be a hydrogen peroxide solution.

23. The method of claim 22, wherein the first oxidant is a hydrogen peroxide solution and the second oxidant is an ozone/oxygen mixture.

24. The method of claim 22, wherein the concentration of hydrogen peroxide in the hydrogen peroxide solution is less than about 70% by weight in water.

25. The method of claim 22, wherein the first and second oxidants chemically react with each other to form hydroxyl radicals.

* * * * *